United States Patent [19]

Williamson et al.

[11] Patent Number: 5,137,934
[45] Date of Patent: Aug. 11, 1992

[54] ALKYLENE OXIDE ADDUCTS AND POLYURETHANE FOAMS PREPARED THEREFROM

[75] Inventors: David J. Williamson, Werribee, Australia; Matthijs van den Engh, Thalwil, Switzerland

[73] Assignee: The Dow Chemical Company, Midland, Mich.

[21] Appl. No.: 414,848

[22] Filed: Sep. 29, 1989

[51] Int. Cl.$^5$ .................. C08G 18/65; C08L 75/08
[52] U.S. Cl. .................. 521/170; 521/137; 521/164; 521/174; 521/175
[58] Field of Search .............. 521/175, 174, 164, 137, 521/170

[56] References Cited

U.S. PATENT DOCUMENTS

| | | | |
|---|---|---|---|
| 4,451,588 | 5/1984 | Speranza et al. | 521/175 |
| 4,490,490 | 12/1984 | Patton, Jr. et al. | 521/175 |
| 4,518,778 | 5/1985 | Cuscurida | 521/164 |
| 4,528,112 | 7/1985 | Speranza et al. | 521/175 |

Primary Examiner—John Kight, III
Assistant Examiner—John M. Cooney, Jr.

[57] ABSTRACT

This invention relates to alkylene oxide adducts prepared by alkoxylating an initiator, containing polymerized ethylene oxide, with a $C_3$ or higher alkylene oxide, and polyurethane foams prepared therefrom. The invention offers the advantage of preparing alkylene oxide adducts and polyurethane foams with acceptable properties, where the availability or the possibility of conducting an alkoxylation reaction with ethylene oxide is restricted or not at all feasible.

14 Claims, No Drawings

ALKYLENE OXIDE ADDUCTS AND POLYURETHANE FOAMS PREPARED THEREFROM

BACKGROUND OF THE INVENTION

This invention is directed towards alkylene oxide adducts, especially polyether polyols, suitable for use in the preparation of flexible slabstock polyurethane foam and the manufacture of such alkylene oxide adducts from initiators comprising polymerized ethylene oxide.

When preparing polyurethane polymers, particularly flexible slabstock foam the nature of the polyol employed can be important for conferring the desired physical properties to the foamed product. Generally speaking, polyether polyols suitable for the preparation of slabstock foam will have an average functionality of from about 2 to about 4 and an equivalent weight of typically from about 800 to about 3000. Such polyether polyols can be prepared by reacting one or more alkylene oxide compounds with an initiator containing active hydrogen atoms in the presence of a basic, alkoxylation catalyst. Typically, the alkylene oxide compounds used usually include ethylene oxide and propylene oxide. Frequently an ethylene oxide content of at least 10 weight percent or more of the resulting polyether polyol is necessary if the product is to be commercially useful. The ethylene oxide content of the polyol serves a number of purposes including minimizing unsaturation and enhancing inherent surfactancy and thus ease of preparing good quality polyurethane foams. Physical properties of resulting foams including, for example, elongation properties are also improved by having an ethylene oxide content. A disadvantage of such a high ethylene oxide content is that it provides the polyol with an inherently high reactivity which consequently in manufacturing of foams permits only for narrow tin catalyst processing ranges.

Handling of, and use of alkylene oxide compounds in reactions to prepare polyether polyols requires care with respect to minimizing and preventing exposure of workers to these potentially harmful chemicals. In addition such alkylene oxide compounds by nature of their structure and oxygen content are often flammable liquids or gases, requiring further care and attention to minimize the risks of fire and/or explosion when being handled. These precautionary measures are required more so when handling ethylene oxide than other alkylene oxide compounds.

It is therefore desirable to find a means of producing polyether polyols which minimizes or eliminates the direct handling and use of ethylene oxide, and yet obtains polyether polyols which possess or confer desirable foam processing and/or foam properties One possible way of avoiding the direct use of ethylene oxide is to use for example ethylene carbonate. When ethylene carbonate is contacted under the appropriate reaction and catalyst conditions with an active hydrogen-containing initiator it functions as ethylene oxide would do, allowing for the alkoxylation, ethoxylation, of the initiator. However, the type of catalyst and reaction conditions required are not the most favorable with respect to obtaining a polyether polyol of good quality for use in manufacturing flexible polyurethane foam. Polyether polyols so prepared can contain high levels of undesirable color, unsaturation and residues of catalyst not necessarily compatible with a polyurethane-forming reaction.

It is therefore desirable to find a means of providing a polyether polyol with an ethylene oxide content by a process which avoids the direct use of ethylene oxide as an alkoxylating agent and yet can provide products of acceptable quality which can be used to prepare polyurethane foams having commercially acceptable performance properties.

SUMMARY OF THE INVENTION

In a first aspect, this invention is a hydroxyl-terminated alkylene oxide adduct suitable for use in preparing flexible polyurethane foams which is a product having an average hydroxyl equivalent weight of from about 800 to about 3000 and containing up to about 20 weight percent polymerized ethylene oxide and which is obtained by reacting a $C_3$, or higher, alkylene oxide with an initiator characterized in that the initiator comprises at least one component (a), having from about 2 to about 4 active hydrogen atoms per molecule, an average hydroxyl equivalent weight of from about 50 to about 750 and comprising from at least 50 percent by weight, polymerized ethylene oxide.

In a second aspect, this invention is a polyurethane foam prepared by reacting a hydroxyl-terminated alkylene oxide adduct with an organic polyisocyanate in the presence of a blowing agent, a surfactant and a catalyst wherein the alkylene oxide adduct is the adduct as described in the first aspect.

In a third aspect, this invention is a polyol composition for use in preparing a flexible polyurethane foam that comprises from about 1 to about 99 percent by weight of a hydroxyl-terminated alkylene oxide adduct wherein the alkylene oxide adduct comprises the adduct as described in the first aspect.

Surprisingly, it has been found that the alkylene oxide adducts of this invention, when used to prepare flexible polyurethane foam, provide for foams having equivalent physical properties to foams prepared with comparative alkylene oxide adducts containing a significantly higher ethylene oxide content. Comparative alkylene oxide adducts are prepared through direct reaction of an initiator with ethylene oxide. In addition, the tin processing range available when manufacturing foam is improved when employing alkylene oxide adducts of this invention.

This invention offers the distinct advantage of preparing competitive alkylene oxide adducts and polyurethane foams therefrom, where the availability or possibility of conducting alkoxylation reactions with ethylene oxide is restricted or not at all feasible.

DETAILED DESCRIPTION OF THE INVENTION

As already described above, this invention is a process for preparing an alkylene oxide adduct by reacting an initiator with an alkylene oxide compound The initiator is characterized in that it comprises at least one component, component (a) having an average of from about 2 to about 4, preferably from about 2 to about 3, and more preferably about 2 active hydrogen atoms per molecule, an average hydroxyl equivalent weight of from about 50 to about 750, and comprising from at least 50 percent by weight, polymerized ethylene oxide. Component (a) is further characterized in that it has an average hydroxyl equivalent weight preferably from about 100, more preferably from about 175, and up to about 500 and more preferably up to about 400. As stated above, component (a) comprises at least in part, polymerized ethylene oxide, preferably from at least 60, more preferably from at least 70, and most preferably from at least 80 percent by weight. The remaining part when not polymerized ethylene oxide is another polymerized alkylene oxide or the residue of the initiator.

For the purpose of this invention active hydrogen atoms are defined as those hydrogens which react positively in the well-known Zerewitinoff test. See Kohler, *Journal of the American Chemical Society*, p. 3181, Vol. 49 (1927). Representative of groups containing active hydrogen atoms are —OH, —COOH, —SH and —NHR where R can be hydrogen, alkyl, cycloalkyl, aryl aromatic and the like. Preferred for component (a) are initiators where the active hydrogen-containing group is —COOH, or —NHR where R can be hydrogen, and especially preferred where the active hydrogen-containing group is —OH.

Suitable initiators for use as component (a) include the alkoxylated products of water, ethylene glycol, propylene glycol, dipropylene glycol, tripropylene glycol, glycerine, butylene glycol, trimethylolpropane, pentaerythritol, hexane triol and its various isomers, ethylenediamine, aminoethylpiperazine, aniline, diaminotoluene, and other aromatic compounds such as 2,2-bis(4-hydroxylphenyl)propane and its halogenated derivatives and condensation products of aniline and formaldehyde, or mixtures thereof. Alkoxylated products of these compounds are adducts of the compound with one or more alkylene oxides comprising ethylene oxide. The above-mentioned compounds may also be used in combination with additional compounds, which may be non-alkoxylated, containing more than 4 active hydrogen atoms per molecule providing that in combination, as component (a), they contain a molar average of from about 2 to about 4 active hydrogen atoms per mole. Suitable additional compounds include carbohydrate compounds such as lactose, α-methylglucoside, α-hydroxyethylglucoside, hexitol, heptitol, sorbitol, dextrose, mannitol, sucrose, or mixtures thereof.

Preferred compounds for use as component (a) include the alkoxylated products of water, ethylene glycol, propylene glycol, butylene glycol, glycerine or mixtures thereof, especially preferred are the ethoxylated products of these compounds having average hydroxyl equivalent weights from about 100 to about 400.

Advantageously the initiator used in the preparation of the alkylene oxide adducts of this present invention further comprises a second component, component (b). Use of a second component can provide for alkylene oxide adducts that are more suitable for preparing flexible polyurethane foams.

When the alkylene oxide adducts of this invention are prepared where the initiator comprises components (a) and (b), component (a) is present in a quantity sufficient to provide the alkylene oxide adduct with good processing characteristics for polyurethane foam formation. Advantageously, component (a) is present in from about 5 to about 50, preferably from about 10 to about 40, and more preferably from about 10 to about 30 percent by weight based upon the combined weights of components (a) and (b) present.

Component (b) is a compound having from about 2 to about 4 active hydrogen atoms per molecule, an average hydroxyl equivalent weight of less than about 500 and comprising less than about 25 percent by weight polymerized ethylene oxide. Preferably component (b) comprises no polymerized ethylene oxide.

Advantageously, component (b) has an average hydroxyl equivalent weight from about 50, preferably from about 75, and more preferably from about 125, up to about 300, preferably up to about 200. The equivalent weight of component (b) can be outside these limits, but for reasons of equipment productivity and economics with respect to preparing the alkylene oxide adduct of this invention it is desirable to remain within these limits Examples of organic compounds suitable as component (b) include water, ethylene glycol, propylene glycol, glycerine, butylene glycol, trimethylolpropane, pentaerythritol, hexane triol and its various isomers, α-methylglucoside, ethylenediamine, aminoethylpiperazine, aniline or condensation adducts of aniline with, for example, formaldehyde, diaminotoluene, or alkoxylated products thereof, or mixtures thereof. The above-mentioned compounds may also be used in combination with additional organic compounds containing active hydrogen atoms providing that in combination, as component (b), they contain a molar average of from about 2 to about 4, preferably from about 2 to about 3 active hydrogen atoms. Other additional compounds include those such as lactose, α-hydroxyethylglucoside, hexitol, sorbitol, dextrose, mannitol, sucrose, or their alkoxylated products, and the like.

Preferred compounds for use as component (b) are water, glycerine, trimethylolpropane, pentaerythritol, hexane triol and its various isomers, ethylenediamine, aminoethylpiperazine, or mixtures thereof, and especially preferred is glycerine. Particularly preferred as component (b) are the alkoxylated adducts of these compounds, especially propoxylated adducts of glycerine or trimethylolpropane.

Suitable alkylene oxides that can be employed for preparing the alkylene oxide adduct of this present invention are the $C_3$, or higher, alkylene oxides and include the α- and β-alkylene oxides and halogenated and aryl-substituted derivatives thereof, glycidyl ethers having from about 3 to about 20 carbon atoms, cyclic ethers such as tetrahydrofuran, mixtures thereof and the like.

Exemplary of these alkylene oxides are 1,2-propylene oxide, 1,2-butylene oxide, 2,3-butylene oxide, styrene oxide, glycidol, epichlorohydrin, allyl glycidyl ether, phenyl glycidyl ether, butyl glycidyl ether, mixtures thereof and the like. The preferred alkylene oxides for use in the process according to this invention include 1,2-propylene oxide, 1,2-butylene oxide, 2,3-butylene oxide and mixtures thereof.

The quantity of alkylene oxide reacted with the initiator depends upon the desired equivalent weight of the alkylene oxide adduct. Advantageously, the quantity of alkylene oxide reacted with the initiator is such so as to provide a resulting adduct having an average hydroxyl equivalent weight from about 800 to about 3000, preferably from about 1000 to about 2500, and more preferably from about 1000 to about 2000.

The alkylene oxide adducts of this invention can be further characterized in that they contain polymerized ethylene oxide introduced by component (a) of the initiator. The polymerized ethylene oxide content of the adduct is up to about 20, preferably from about 1 to about 10, more preferably from about 1 to about 7, and most preferably from about 1 to about 5 weight percent of the average hydroxyl equivalent weight of the adduct. Alkylene oxide adducts of this invention having average equivalent weights and proportions of polymerized ethylene oxide outside these limits can be prepared, but when employed to prepare flexible polyurethane foam, such resulting foam may not exhibit the desired characteristics and properties.

Suitable processes for the preparation of alkylene oxide adducts have been disclosed in *The Encyclopaedia of Chemical Technology*, Vol. 7, pp. 257-266, published by Interscience Publishers Inc. (1951), and U.S. Pat. No. 1,922,459.

When preparing the alkylene oxide adducts of this present invention, advantageously the reaction of alkylene oxide with initiator is conducted in the presence of a catalytic amount of an alkoxylation catalyst.

The choice of alkoxylation catalyst used in the preparation of the alkylene oxide adduct is well-known to those skilled in the art of preparing polyether polyols. Preferred catalysts are compounds of the group I and group II metals of the Periodic Table comprising, for example, sodium hydroxide, potassium hydroxide, barium hydroxide, strontium hydroxide, caesium hydroxide, potassium methoxide and the like. In a preferred embodiment of this process the catalyst of choice is barium hydroxide, as this allows for the preparation of adducts with a minimized unsaturation level.

Unsaturation is the formation of adducts containing a double bond. Such adducts can form through rearrangement reactions of any alkylene oxide compound containing hydrogen atom(s) on a tertiary center of the oxirane ring. Propylene oxide is especially prone to such rearrangement.

When preparing the alkylene oxide adducts of this invention, the initial concentration of the catalyst is such so as to provide for the preparation of the product in an acceptable time. Advantageously, at least 100 ppm, and preferably at least 500 ppm of metal cation based upon the weight of initiator present is suitable for catalyzing the reaction. Preferably, the catalyst is present in an amount from about 0.01 to about 50 percent by weight based upon the weight of the initiator to be reacted.

The quantity of catalyst used to catalyze the reaction should be such that the resulting crude product, prior to neutralization or treatment to remove residual catalyst, contains less than about 20,000, preferably less than about 10,000 and most preferably less than about 5,000 ppm of the metal based on the weight of the end product present.

The reaction of alkylene oxide with initiator is advantageously conducted at a temperature within the range of 60° C. to 180° C., and preferably within the range of 75° C. to 130° C. The reaction is normally conducted in a closed system at a pressure normally not exceeding 150 pounds per square inch gauge (psig), preferably not exceeding 120 psig and most preferably not exceeding 75 psig. These pressures are maintained by controlling the feed rates of the alkylene oxides and thus the quantity of oxide in the gaseous phase at the reaction temperature. Temperatures and pressures over and above these ranges are generally not beneficial to the quality of resultant product obtained, and products with a high level of color or unsaturation may be produced The residual catalyst in the resulting alkylene oxide adduct may be neutralized and/or removed by any of the procedures well-known to those skilled in the art, for example, neutralization of the catalyst by acids such as phosphoric acid, sulfuric acid, acetic acid and solid organic acids as described in U.S. Pat. No. 3,000,963.

The catalyst may also be removed by the carbon dioxide finishing procedure as described in the Japanese Patent 55/092,733-A, or removed by adsorption on activated clay such as, for example, magnesium silicate.

After removal and/or neutralization of the catalyst, the metal cation content of the alkylene oxide adduct advantageously is less than about 200 ppm, preferably less than 80 ppm, and more preferably less than 40 ppm. Catalyst concentrations greater than this in the end product are generally not beneficial to the use of the product in the preparation of polyurethanes.

The alkylene oxide adducts prepared by the process of this invention may be blended with other compounds containing active hydrogen groups. Such blends are referred to hereinafter as polyol compositions. Polyol compositions when prepared can comprise from 1 to 99 weight percent by total weight of the composition, of the alkylene oxide adduct. Polyol compositions are of value for manufacturing polyurethane polymers.

The alkylene oxide adducts of the invention may be contacted under reaction conditions with polyisocyanates to produce polyurethane polymers The alkylene oxide adducts can be reacted with the polyisocyanates optionally in the presence of other active hydrogen-containing compounds, blowing agents, catalysts, surfactants, stabilizers, fillers, dyes, flame retardants and other additives.

Polyisocyanates which may be used in preparing the polyurethane foam include aromatic, aliphatic and cycloaliphatic polyisocyanates and combination thereof. Representative examples are diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 2,4-diphenylmethane diisocyanate, 4,4'-diphenylmethane diisocyanate and mixtures, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate.

Polyisocyanates and prepolymers, including those modified prior to reacting with the alkylene oxide adduct may also be employed. Especially useful, and preferred, due to their availability and properties are the toluene diisocyanates, 4,4'-diphenylmethane diisocyanate, 2,4'-diphenylmethane diisocyanate and polymethylene polyphenyl polyisocyanate, commonly referred to as "crude MDI." The preferred polyisocyanates can be used alone or in combinations when being reacted with the alkylene oxide adduct of this invention.

The polyisocyanate reacting with the alkylene oxide adduct is present in such a quantity to provide a ratio of isocyanate groups to total active hydrogen atoms present, including those of the alkylene oxide adduct and any other compounds present containing active hydrogen atoms, of from about 0.8:1 to about 1.3:1 and preferably from about 0.9:1 to about 1.1:1.

Suitable catalysts that may be used alone or in a mixture include for example, tertiary amines, such as triethylenediamine, N-methylmorpholine, N-ethylmorpholine, triethylamine, 2-methyltriethylenediamine, mixtures thereof, and the like. Also organic tin compounds can be used such as, for example, stannous octoate, stannous oleate, stannous laurate, dibutyltin dilaurate, dibutyltin di-2-ethylhexoate and dibutyltin dibutoxide.

Advantageously, a combination of tertiary amine and organic tin compounds can be employed.

The optimum concentration of the organotin catalyst must be determined experimentally, and will depend on a number of factors including the reactivity of the alkylene oxide adduct and/or the polyol composition and the isocyanate. Typically the concentration of the organotin catalyst is from about 0.05 to 3.0 parts by weight per 100 parts of alkylene oxide adduct or polyol composition comprising the alkylene oxide adduct, and preferably from 0.05 to 2.0 parts by weight.

The reaction mixture may also contain a surfactant or stabilizer or other cell size control agent. Such materials are well-known in the art and reference is made thereto for the purpose of the present invention. In general, representative of such foam surfactants are alkoxysilanes, polysilylphosphonates, polydimethylsiloxanes, the condensates of ethylene oxide with a hydrophobic base formed by condensing propylene oxide with propylene glycol, the alkylene oxide adducts of ethylenediamine, and the polyoxyalkylene esters of long chain fatty acids and sorbitan, and (siloxaneoxyalkylene) block copolymers Preferred of such materials are the siloxaneoxyalkylene block copolymers. Such block copolymers are described in U.S. Pat. Nos. 2,834,748; 2,917,480; 3,505,377; 3,507,815; 3,563,924 and 4,483,894.

Examples of suitable surfactants are the products sold by, for example, Goldschmidt under the trademark "Tegostab" including Tegostab B-4113, B-4380, and B-8681 and the surfactant DC-5043, sold by Dow Corning Corporation Examples of suitable stabilizers are Tegostab BF-2270, BF-2370, BF-4900 and B-3136 sold by Goldschmidt and the Dow Corning Corporation products DC-190 and DC-198. The foam stabilizer, surfactant is generally employed in amounts from about 0.05 to about 5.0, preferably from about 0.1 to about 2.0, parts by weight per one hundred parts of alkylene oxide adduct.

In addition to the above described components, the foaming mixture can optionally contain any of a variety of additives commonly employed in the preparation of flexible urethane foams. Representative additives include fire-retardant agents, fillers, dyes, pigments, antioxidizing agents, fungicides and the like. Cross-linkers used to modify foam properties can also be incorporated in the reacting mixture Representative cross-linkers are alkylamines, diamines, glycerine, diethanolamine and the like.

Suitable blowing agents for preparing a polyurethane foam are those organic compounds having a boiling point of from about −40° C. to about 90° C. and include the chlorinated and/or the fluorinated hydrocarbons such as tetrafluoromethane, bromotrifluoromethane, chlorotrifluoromethane, dibromodifluoromethane, dichlorodifluoromethane, trichlorofluoromethane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro-1,2,3-trifluorocyclopropane, octafluorocyclobutane, 1,2-dichloro-1,2,3,3,4,4-hexafluorocyclobutane, 1,2,3,4-tetrachloro-1,2,3,4-tetrafluorocyclobutane, trichloroethylene, trichloroethane, chloroform, dichloromethane, carbon tetrachloride and low boiling hydrocarbons including alkanes and/or alkenes such as butane, pentane, and hexane.

In a preferred embodiment for the preparation of polyurethane foam with alkylene oxide adducts of this invention the blowing agent is carbon dioxide generated from the reaction of isocyanate with water. The water is generally used in an amount of 1 to 10 parts by weight per 100 parts polyol composition. Sufficient amounts of blowing agent are used to give foams of the desired densities. The water-generated carbon dioxide accounts for the major portion of the blowing agent required to produce foam of the desired density. At least 50 percent, preferably at least 60 percent and more preferably at least 75 percent of the total blowing agent requirement needed for the production of the foam can be derived from the reaction of water with isocyanate to generate carbon dioxide If necessary, the remainder of the blowing agent requirement for the production of the foam can be provided by one or more of the above-listed suitable blowing agents.

In any event, the polyurethane polymers prepared with the alkylene oxide adduct of this invention are flexible products advantageously having densities of from about 6 to about 500, preferably from about 6 to about 200, more preferably from about 6 to about 100, and most preferably from about 10 to about 60 kilograms per cubic meter. These densities can be achieved by preparing the polymer in the presence of an appropriate quantity of blowing agent and/or blowing agent precursor.

Suitable processes for the preparation of polyurethane polymers are discussed in U.S. Pat. Nos. 24514, 3,821,130, and G.B. Patent 1,534,258. Suitable equipment, material and processes for the preparation of polyurethane polymers is further discussed by J. H. Saunders and K. C. Frisch in "Polyurethanes Chemistry and Technology," Volumes I and II, R. E. Krieger Publishing Company, Inc., ISBN 0-89874-561-6.

Generally, flexible foams can be prepared in a one-step process by reacting all the ingredients together at once or alternatively, foams can be made by the so-called "quasi-prepolymer method." In the one-shot process, where foaming is carried out in machines, the active hydrogen-containing products, catalysts, surfactants, blowing agents and optional additives may be introduced through separate pipes to the mixing head where they are combined with the polyisocyanate to give the polyurethane-forming mixture. The mixture may be poured or injected into a suitable container or mold as required. For use of machines with a limited number of component lines into the mixing head, a premix of all the components except the polyisocyanate (and blowing agent when a gas is used) to give a polyol formulation, can be advantageously employed This simplifies the metering and mixing of the reacting components at the time the polyurethane-forming mixture is prepared.

Alternatively, the foams may be prepared by the so-called "quasi-prepolymer method." In this method a portion of the polyol component is reacted in the absence of catalysts with the polyisocyanate component in proportion so as to provide from about 10 percent to about 40 percent of free isocyanato groups in the reaction product based on the weight of prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a flexible polyurethane foam is provided.

The alkylene oxide adducts of this invention are useful for the manufacture of polyurethane polymers in a variety of application areas. Areas include flexible slabstock and molded foam, carpet backing and rigid foams for laminate and insulative applications. Non-cellular polyurethane polymers may also be prepared including elastomers suitable for use as coatings, moldings, and shoe soles.

It is found that the alkylene oxide adducts of this invention when used to prepare flexible polyurethane foam provide acceptable foam properties and further allow for good tin catalyst processing ranges and flexibility within foam-forming compositions. The tin catalyst processing ranges are improved and generally become wider as the inherent reactivity of the adduct to isocyanate apparently is reduced through incorporating polymerized ethylene oxide via the initiator as opposed to introducing such ethylene oxide as part of the alkylene oxide feed during preparation of the adduct.

In addition, the alkylene oxide adducts of this invention may also be used to modify polyisocyanates in the preparation of isocyanate-terminated prepolymers.

Illustrative Embodiments

The following examples are given to illustrate the invention and should not be interpreted as limiting it in any way. Unless stated otherwise, all parts and percentages are given by weight.

In the following examples relating to the preparation of the alkylene oxide adduct hydroxyl number of the adduct is observed according to procedure ASTM E-326-69 and unsaturation content according to procedure D-2849-69.

In the following examples relating to the preparation of polyurethane foams, the properties of the foams can be determined in accordance with the following standard test procedures; resilience - ASTM D 3574-81, modulus and compressive load deflection (CLD) - DIN 53577, tensile strength and elongation - DIN 53571, tear resistance - DIN 53515.

EXAMPLE 1

An initiator is prepared in a reactor by mixing 191 parts by weight of a propoxylated glycerine, component (b), adduct having an equivalent weight of about 150 with 13.1 parts by weight of 45 percent aqueous potassium hydroxide. The resulting mixture is heated at about 115° C. and at a pressure less than one atmosphere until the concentration of the water within the mixture is less about 0.05 percent. To this resulting mixture is added 75 parts by weight of a component (a), a polyoxyethylene glycol having an equivalent weight of 300 and containing about 97 percent by weight polymerized ethylene oxide. The new resulting mixture is further heated and maintained at a temperature of about 115° C. and at a pressure less than one atmosphere until the concentration of the water within the mixture is less than about 0.074 percent. The resulting initiator contains 28 percent by weight of component (a), based on the combined weights of components (a) and (b).

To the resulting initiator is added, over a period of 8 to 10 hours at 120° C., 1308 parts by weight of 1,2-propylene oxide. After addition of the propylene oxide is completed, the contents of the reactor are maintained at about 120° C. for a further 4 hours to allow for complete reaction of the propylene oxide. After this period the potassium hydroxide is removed from the resulting alkylene oxide adduct by use of magnesium silicate, and then the adduct dried by use of reduced pressures below one atmosphere and at 115° C.

The so-obtained alkylene oxide adduct has a hydroxyl number of 57.4, a water content of 0.023 percent, an unsaturation level of 0.039 meq/gram, viscosity 222 centistokes at 37.7° C., a pH of 8.9, and theoretically contains 4.6 percent by weight polymerized ethylene oxide introduced by component (a) of the initiator.

EXAMPLE 2

This example, a 1000 equivalent weight alkylene oxide adduct, is prepared from an initiator having the same component (a) and component (b) as described for Example 1. Component (a) of the initiator is present in 30 percent by weight based on the combined weights of components (a) and (b).

The alkylene oxide adduct is prepared following the procedure given in Example 1, using 79 parts by weight component (a), 185 parts by weight component (b), 13.0 parts by weight 45 percent aqueous potassium hydroxide and 1262 parts by weight propylene oxide.

The so-obtained alkylene oxide adduct has a hydroxyl number of 54.5, viscosity 223 centistokes at 25° C., a pH of 8.7, and theoretically contains 6.0 percent by weight polymerized ethylene oxide introduced by component (a) of the initiator.

EXAMPLE 3

This example illustrates the preparation of an alkylene oxide adduct having an average hydroxyl equivalent weight of 1000 using a different initiator.

The alkylene oxide adduct is prepared from an initiator which consists of component (a) an ethoxylated monopropylene glycol having an average hydroxyl equivalent weight of 300 and containing about 87 percent by weight of its total weight, polymerized ethylene oxide, and component (b) a propoxylated glycerine adduct having an equivalent weight of 150. Component (a) of the initiator is present in 20 percent by weight based on the combined weights of components (a) and (b).

The alkylene oxide adduct is prepared following the procedure given in Example 1, using 51 parts by weight component (a), 202 parts by weight component (b), 12.5 parts by weight 45 percent aqueous potassium hydroxide and 1265 parts by weight propylene oxide.

The so-obtained alkylene oxide adduct has a hydroxyl number of 57.4, a water content of 0.026 percent, an unsaturation level of 0.041 meq/gram, viscosity 232 centistokes at 37.7° C., a pH of 8.8, and theoretically contains 2.9 percent by weight polymerized ethylene oxide introduced by component (a) of the initiator.

EXAMPLE 4

This example is prepared by the procedure given in Example 1 and using an initiator having the components (a) and (b) as described for Example 3. However, for this example component (a) of the initiator is present in 10 percent by weight based on the combined weights of components (a) and (b).

The alkylene oxide adduct is prepared using 24 parts by weight component (a), 212 parts by weight component (b), 12.5 parts by weight 45 percent aqueous potassium hydroxide and 1263 parts by weight propylene oxide.

The so-obtained alkylene oxide adduct has a hydroxyl number of 55.4, a water content of 0.017 percent, an unsaturation level of 0.041 meq/gram, viscosity 241 centistokes at 37.7° C., a pH of 8.6, and theoretically contains 1.4 percent by weight polymerized ethylene oxide introduced by component (a) of the initiator.

EXAMPLE 5

This example illustrates the preparation of an alkylene oxide adduct having an average hydroxyl equivalent weight of 1167.

The alkylene oxide adduct is prepared from an initiator which consists of component (a) a polyoxyethylene glycol having an equivalent weight of 400 and containing about 97.8 percent by weight polymerized ethylene oxide, and component (b) a propoxylated glycerine adduct having an equivalent weight of 150. Component (a) of the initiator is present in 25 percent by weight based on the combined weights of components (a) and (b).

The alkylene oxide adduct is prepared following the procedure given in Example 1, using 60 parts by weight component (a), 180 parts by weight component (b), 13.5 parts by weight 45 percent aqueous potassium hydroxide and 1343 parts by weight propylene oxide.

The so-obtained alkylene oxide adduct has a hydroxyl number of 48.0, a pH of 8.3, and theoretically contains 3.7 percent by weight polymerized ethylene oxide introduced by component (a) of the initiator.

EXAMPLE 6

This example illustrates the preparation of an alkylene oxide adduct having an average hydroxyl equivalent weight of 1230.

The alkylene oxide adduct is prepared from an initiator having an average hydroxyl equivalent weight of 300 and containing a polymerized ethylene oxide content of 72 percent by weight. The initiator itself is obtained by reacting ethylene oxide with glycerine and ethylene glycol present in an 80:20 weight ratio.

Following the alkoxylation procedure of Example 1, 200 parts by weight of initiator is reacted with 620 parts by weight propylene oxide in the presence of 9.5 parts by weight 45 percent aqueous potassium hydroxide.

The so-obtained alkylene oxide adduct has a hydroxyl number of 45.6, a water content of 0.03 percent, an unsaturation level of 0.053 meq/gram, viscosity 321 centistokes at 37.7° C., a pH of 9.1, and theoretically contains 17.6 percent by weight polymerized ethylene oxide introduced by the initiator.

EXAMPLE 7

Flexible slabstock polyurethane foams, samples 1 to 4 are prepared from the alkylene oxide adduct as obtained in Example 2. Comparative foam samples A to D are prepared from a comparative alkylene oxide adduct (C-1) having a hydroxyl equivalent weight of 1000 and being the product of reacting propylene oxide and ethylene oxide as a heterofeed with glycerine. The comparative alkylene oxide adduct contains 12 percent by weight ethylene oxide.

The foams are prepared according to the formulations given in Table I, and the properties of the resulting foams is given in Table II.

Foams prepared with the alkylene oxide adduct of this invention show properties equivalent to those prepared with the comparative alkylene adduct. Significantly, such properties are obtained with an alkylene oxide adduct containing substantially less polymerized ethylene oxide, 6 percent compared to 12 percent by weight. As can be seen from Table I, the tin octoate catalyst levels are higher when using alkylene oxide adducts of this invention. The higher levels reflect the wider tin catalyst processing ranges available and hence greater processing flexibility when preparing open-celled flexible polyurethane foam.

TABLE I

|  | Sample 1 | Sample 2 | Sample 3 | Sample 4 | Comparative Sample A* | Comparative Sample B* | Comparative Sample C* | Comparative Sample D* |
|---|---|---|---|---|---|---|---|---|
| TDI ① Index | 107 | 107 | 107 | 107 | 107 | 107 | 107 | 107 |
| Alkylene Oxide Adduct (Ex-2) | 100 | 100 | 100 | 100 | — | — | — | — |
| Comparative Alkylene Oxide Adduct C-1* | — | — | — | — | 100* | 100* | 100* | 100* |
| Water | 4.7 | 4.7 | 3.5 | 3.5 | 4.7 | 4.7 | 3.5 | 3.5 |
| Surfactant ② | 1.1 | 1.1 | 1.0 | 1.0 | 1.1 | 1.1 | 1.0 | 1.0 |
| DMEA ③ | 0.12 | 0.12 | 0.18 | 0.18 | 0.12 | 0.12 | 0.18 | 0.18 |
| Niax A1 ④ | 0.06 | 0.06 | 0.09 | 0.09 | 0.06 | 0.06 | 0.09 | 0.09 |
| Stannous Octoate | 0.35 | 0.30 | 0.35 | 0.30 | 0.25 | 0.20 | 0.25 | 0.20 |

*Not an example of this invention
① Toluene diisocyanate 80:20 ratio of 2,4- and 2,6-isomer
② Silicone Surfactant, Tegostab BF 2370 sold by Th Goldschmidt Ag
③ Dimethylethanolamine
④ Niax A1 - 70% bis(dimethylaminoethyl) ether, 30% dipropylene glycol sold by Union Carbide.

TABLE II

|  | Sample 1 | Sample 2 | Sample 3 | Sample 4 | Comparative Sample A* | Comparative Sample B* | Comparative Sample C* | Comparative Sample D* |
|---|---|---|---|---|---|---|---|---|
| Density (Kg/M$^3$) | 20 | 20 | 25 | 25 | 20 | 21 | 26 | 27 |
| CLD (40%) (KPa) | 3.48 | 3.54 | 3.68 | 3.68 | 3.87 | 3.55 | 4.21 | 3.95 |
| Tensile Strength (KPa) | 115 | 114 | 113 | 111 | 119 | 120 | 115 | 113 |
| Elongation (%) | 200 | 190 | 184 | 202 | 199 | 176 | 181 | 172 |
| Resilience (%) | 38 | 42 | 43 | 47 | 43 | 42 | 46 | 47 |
| Modulus | 2.13 | 2.17 | 2.07 | 2.04 | 2.11 | 2.07 | 2.01 | 2.04 |

TABLE II-continued

|  | Sample 1 | Sample 2 | Sample 3 | Sample 4 | Comparative Sample A* | Comparative Sample B* | Comparative Sample C* | Comparative Sample D* |
|---|---|---|---|---|---|---|---|---|
| (65/25 CLD) | | | | | | | | |

*Not an example of this invention.

EXAMPLE 8

Flexible slabstock polyurethane foams, samples 5 to 7, are prepared from the alkylene oxide adduct as obtained in Example 4. Comparative foam samples E and F are prepared from a comparative alkylene oxide adduct (C-2) having a hydroxyl equivalent weight of 1170 and being the product of reacting propylene oxide and ethylene oxide as a heterofeed with glycerine. The comparative alkylene oxide adduct contains 12 percent by weight ethylene oxide compared to the 1.4 percent of Example 4.

Foams are prepared according to the formulations given in Table III, properties of the resulting foams are reported in Table IV.

TABLE III

|  | Sample 5 | Sample 6 | Sample 7 | Comparative Sample E* | Comparative Sample F* |
|---|---|---|---|---|---|
| TDI Index ① | 110 | 100 | 100 | 100 | 100 |
| Alkylene Oxide Adduct (Ex-4) | 100 | 100 | 100 | — | — |
| Comparative Alkylene Oxide Adduct (C-2)* | — | — | — | 100* | 100* |
| Water | 4.5 | 3.5 | 2.5 | 4.5 | 2.5 |
| Surfactant-1 ② | 1.8 | 1.0 | — | 1.8 | — |
| Surfactant-2 ③ | — | — | 1.0 | — | 1.0 |
| Dabco 33LV ④ | 0.1 | 0.25 | — | 0.1 | — |
| DMEA ⑤ | 0.2 | — | 0.8 | 0.2 | 0.08 |
| Niax A1 ⑥ | — | — | 0.04 | — | 0.04 |
| Methylene Chloride | 15.0 | — | — | 15.0 | — |
| Stannous Octoate | 0.55 | 0.30 | 0.18 | 0.45 | 0.18 |

*Not an example of this invention
① Toluene diisocyanate 80.20 ratio of 2,4- and 2,6-isomer
② Niax L-540, silicone surfactant sold by Union Carbide
③ Tegostab B-3136, silicone surfactant sold by Th Goldschmidt Ag
④ 33% solution of triethylene diamine in dipropylene glycol sold by Air Products
⑤ Dimethylethanolamine
⑥ Niax A1 - 70% bis(dimethylaminoethyl) ether, 30% dipropylene glycol sold by Union Carbide

TABLE IV

|  | Sample 5 | Sample 6 | Sample 7 | Comparative Sample E* | Comparative Sample F* |
|---|---|---|---|---|---|
| Density (Kg/M³) | 14.7 | 26.1 | 34.2 | 14.3 | 34.7 |
| Tensile Strength (KPa) | 83 | 130 | 102 | 69 | 76 |
| Elongation (%) | 222 | 200 | 140 | 184 | 174 |
| Resilience (%) | 41 | 50 | 57 | 45 | 53 |
| Modulus (65/25 CLD) | 1.83 | 2.00 | 2.06 | 1.82 | 2.33 |

*Not an example of this invention

The foams prepared with the alkylene oxide adduct of the invention exhibit equivalent modulus, load bearing properties, and display improved tensile strengths and elongation properties. In addition, they have also been discovered to have improved dynamic flexural fatigue properties.

What is claimed is:

1. A hydroxyl-terminated alkylene oxide adduct suitable for use in preparing flexible polyurethane foams which is a product having an average hydroxyl equivalent weight of from about 800 to about 3000 and containing up to about 20 weight percent polymerized ethylene oxide and which is obtained by reacting a $C_3$, or higher, alkylene oxide with an initiator characterized in that the initiator comprises at least one component (a), having from about 2 to about 4 active hydrogen atoms per molecule, an average hydroxyl equivalent weight of from about 50 to about 750 and comprising from at least 50 percent by weight, polymerized ethylene oxide.

2. The alkylene oxide adduct of claim 1 wherein the initiator further comprises a component (b), having from about 2 to about 4 active hydrogen atoms per molecule, an average hydroxyl equivalent weight of less than about 500 and comprising less than about 25 percent by weight polymerized ethylene oxide.

3. The alkylene oxide adduct of claim 2 wherein component (a) of the initiator is present in from about 5 to about 50 weight percent, based upon the combined weights of components (a) and (b).

4. The alkylene oxide adduct of claim 3 wherein component (a) of the initiator is composed of at least 60 percent by weight of polymerized ethylene oxide.

5. The alkylene oxide adduct of claim 1 wherein component (a) of the initiator has an average hydroxyl equivalent weight of from about 100 to about 500.

6. The alkylene oxide adduct of claim 5 wherein component (a) of the initiator has an average hydroxyl equivalent weight of from about 175 to about 400.

7. The alkylene oxide adduct of claim 3 wherein component (a) of the initiator has an average hydroxyl equivalent weight of from about 100 to about 500 and is composed of from at least 70 percent by weight, of polymerized ethylene oxide.

8. The alkylene oxide adduct of claim 7 wherein component (a) of the initiator has an average hydroxyl equivalent weight of from about 175 to about 400.

9. The alkylene oxide adduct of claim 3 wherein component (a) of the initiator is present in from about 10 to about 40 weight percent, based up on the combined weights of components (a) and (b).

10. The alkylene oxide adduct of claim 9 wherein component (a) of the initiator is present in from about 10 to about 30 weight percent, based up on the combined weights of components (a) and (b).

11. The alkylene oxide adduct of claim 1 wherein the $C_3$, or higher, alkylene oxide reacting with the initiator is 1,2-propylene oxide, 1,2-butylene oxide, 2,3-butylene oxide and mixtures thereof.

12. The alkylene oxide adduct of claim 9 having an average hydroxyl equivalent weight of from about 1000 to about 2500 which is the product of reacting 1,2-propylene oxide with an initiator that comprises:
 a component (a) having an average hydroxyl equivalent weight of from about 175 to about 400 and being composed of at least 70 percent by weight, of polymerized ethylene oxide, and a component (b) having from about .2 to about 4 active hydrogen atoms per molecule, an average hydroxyl equivalent weight of from about 50 to about 500 and containing no polymerized ethylene oxide.

13. A polyurethane foam prepared by reacting an alkylene oxide adduct with an organic polyisocyanate in the presence of a blowing agent, a surfactant and a catalyst wherein the alkylene oxide adduct comprises the adduct of claim 1.

14. A polyol composition for use in preparing a flexible polyurethane foam that comprises from about 1 to about 99 percent by weight of an alkylene oxide adduct wherein the alkylene oxide adduct is the adduct of claim 1.

* * * * *